(12) United States Patent
Hirata

(10) Patent No.: US 6,708,792 B2
(45) Date of Patent: Mar. 23, 2004

(54) REARWARD DISPLACEMENT PREVENTION MECHANISM FOR VEHICLE CONTROL PEDALS

(75) Inventor: Youichi Hirata, Aichi (JP)

(73) Assignee: Mitsubishi Jidosha Kogyo Kabushiki Kaisha, Tokyo (JP)

(*) Notice: Subject to any disclaimer, the term of this patent is extended or adjusted under 35 U.S.C. 154(b) by 54 days.

(21) Appl. No.: 10/050,559

(22) Filed: Jan. 18, 2002

(65) Prior Publication Data
US 2002/0096383 A1 Jul. 25, 2002

(30) Foreign Application Priority Data
Jan. 19, 2001 (JP) ......................................... 2001-011538

(51) Int. Cl.⁷ .......................... B60K 28/14; G05G 1/14
(52) U.S. Cl. .......................................... 180/274; 74/512
(58) Field of Search ................................. 180/271, 274, 180/275; 74/512, 560, 513, 522

(56) References Cited

U.S. PATENT DOCUMENTS

| | | | | |
|---|---|---|---|---|
| 5,921,144 A | * | 7/1999 | Williams et al. | 74/512 |
| 5,983,746 A | * | 11/1999 | Nawata et al. | 74/512 |
| 6,055,883 A | * | 5/2000 | Kato | 74/512 |
| 6,142,036 A | * | 11/2000 | Mizuma et al. | 74/512 |
| 6,176,340 B1 | * | 1/2001 | Mizuma et al. | 180/274 |
| 6,276,228 B1 | * | 8/2001 | Hoerster | 74/512 |
| 6,339,971 B1 | * | 1/2002 | Kato | 74/512 |

FOREIGN PATENT DOCUMENTS

| | | |
|---|---|---|
| EP | 0803420 A | 10/1997 |
| JP | 9-254821 A | 9/1997 |

* cited by examiner

Primary Examiner—David R. Dunn
(74) Attorney, Agent, or Firm—Birch, Stewart, Kolasch & Birch, LLP

(57) ABSTRACT

A guide member connected to a pedal bracket in a rearward displacement prevention mechanism guides one end of a pedal bracket downward toward the rear of a vehicle along a longitudinal side of the vehicle when the pedal bracket is released from a guide member, and an end of the guide member in a pedal bracket guiding direction is covered at least partially such that the guide member has a closed cross-section. Further, there is provided a column support bracket that restricts the position of the pedal bracket after it is released from the guide member. Therefore, the rearward displacement prevention mechanism can prevent the displacement of a control pedal in a desired condition by guiding the one end of the pedal bracket with the guide member and restricting the position of the pedal bracket by the column support bracket irrespective of the state in which a dash panel is deformed.

7 Claims, 5 Drawing Sheets

REARWARD DISPLACEMENT PREVENTION MECHANISM FOR VEHICLE CONTROL PEDALS

This non-provisional application claims priority under 35 U.S.C. §119(a) on Patent Application No. 2001-011538 filed in Japan on Jan. 19, 2001, which is herein incorporated by reference.

BACKGROUND OF THE INVENTION

1. Field of the Invention

This invention relates to a rearward displacement prevention mechanism for vehicle control pedals.

2. Description of the Related Art

When a large energy is applied to the front end of a vehicle in collision or the like, the vehicle may decelerate to a large degree and a dash panel, partitioning the vehicle into an engine room and a vehicle compartment, may be deformed toward the vehicle compartment. The deformation of the dash panel toward the vehicle compartment reduces a foot space at a driver's seat, and this may cause a suspended control pedal (e.g. brake pedal) supported in the foot space to be displaced toward a driver. To address this problem, there have been proposed a variety of mechanisms for moving a brake pedal relatively toward the dash panel in a case where the dash panel is deformed toward a vehicle compartment.

For example, Japanese Laid-open Patent Publication (Kokai) No. 9-254821 proposes a mechanism that guides a pedal bracket, which rotatably supports the upper part of a brake pedal, diagonally downward by a-means of a sliding member provided in a vehicle body and thus moves the brake pedal relatively toward the dash panel. This mechanism enables the brake pedal to move back towards the front of the vehicle when energy is applied to the front end of the vehicle.

The conventional mechanism, however, has a problem in that the brake pedal cannot be surely moved back toward the dash panel when the dash panel is deformed in directions including a horizontal direction, because the dash panel is deformed in different ways according to the types of collision such as head-on collision and offset collision and the types of equipped engines.

It is therefore an object of the present invention to provide a rearward displacement prevention mechanism for vehicle control pedals, which is capable of preventing the displacement of the vehicle control pedals in a undesired condition irrespective of the state in which a dash panel is deformed.

SUMMARY OF THE INVENTION

To attain the above object, according to the present invention, a guide member connected to a pedal bracket guides one end of the pedal bracket downward toward the rear of a vehicle when the pedal bracket is released from the guide member, and the end of the guide member in the pedal bracket guiding direction is covered at least partially so that the guide member can have a closed section, and there is provided a restricting section that restricts the position of the pedal bracket after it is released from the guide member. It is therefore possible to prevent the displacement of the control pedal in a desired condition by guiding the one end of the pedal bracket by the guide member and restricting the position of the pedal bracket by the restricting section irrespective of the state in which the dash panel is deformed.

In one preferred form of the present invention, the restricting section is integrated with the bracket of the steering column. Therefore, a common part can be used for supporting the steering column and guiding the bracket to prevent the cost from rising. In another preferred form of the present invention, a bead for crashing is provided at the rear end of the pedal bracket so that the rear end of the pedal bracket can move more easily toward the guiding section and the restricting section.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PRESENTLY PREFERRED EMBODIMENT

Figure 1:
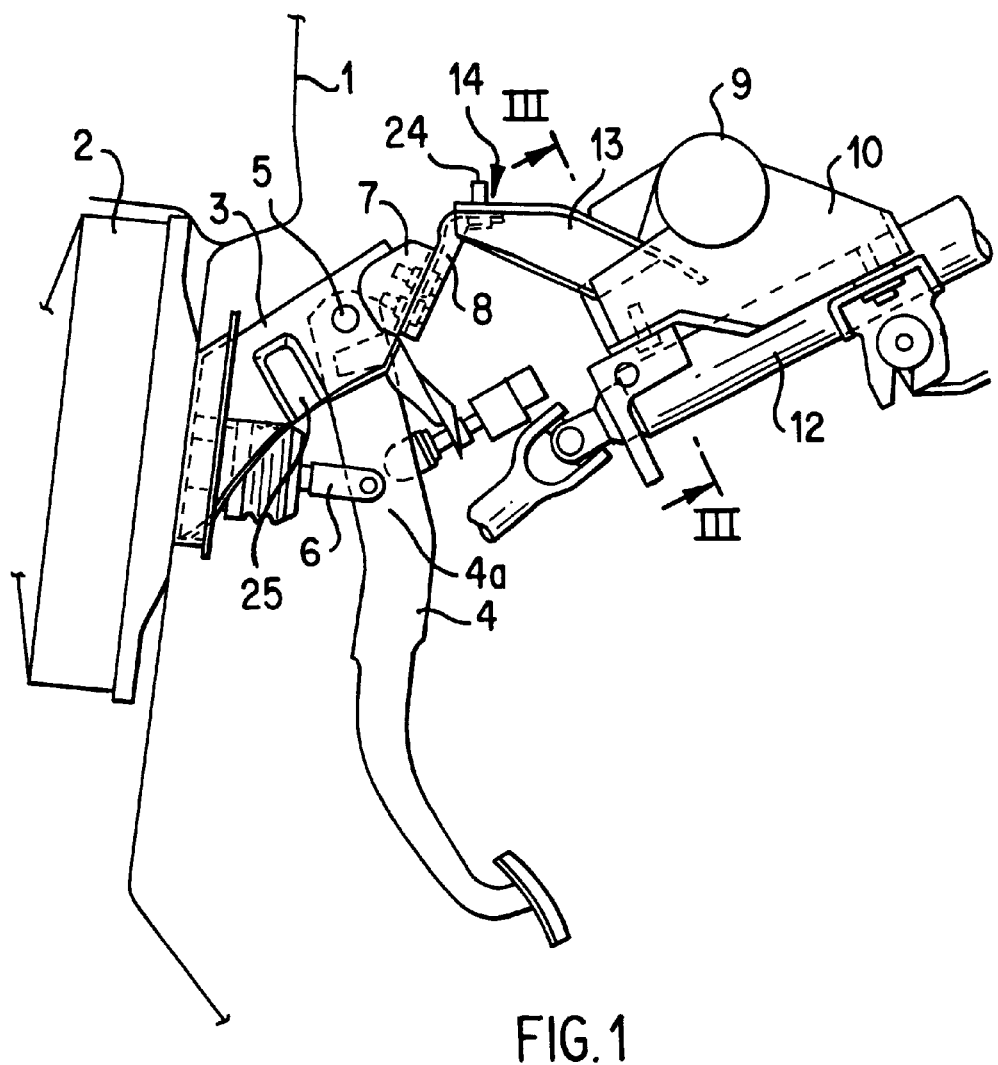
FIG. 1 is a schematic side view showing the arrangement of a rearward displacement prevention mechanism for control pedals according to an embodiment of the present invention.
Figure 2:
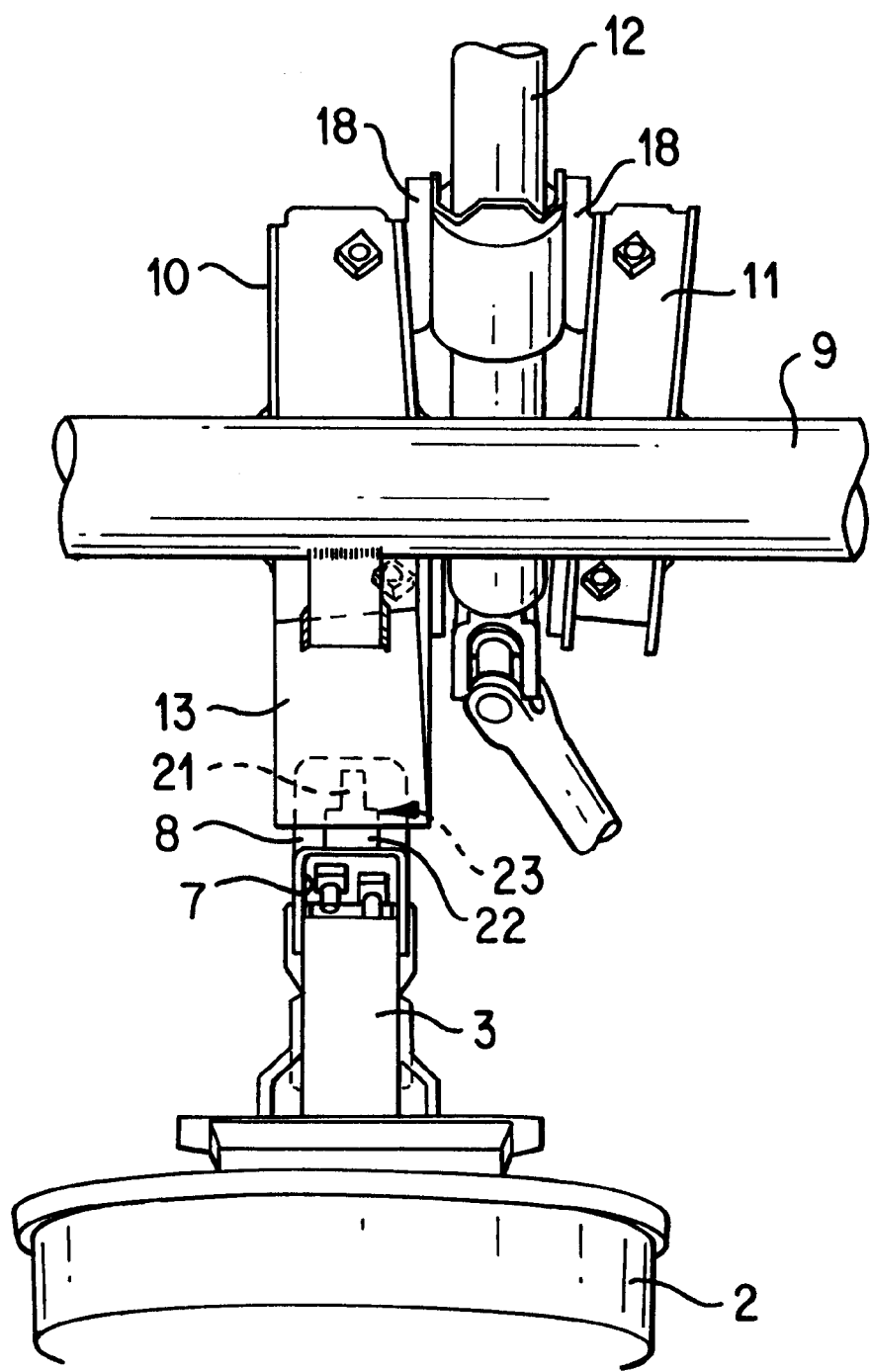
FIG. 2 is a plan view showing the arrangement of the rearward displacement prevention mechanism for control pedals according to the embodiment.
Figure 3:
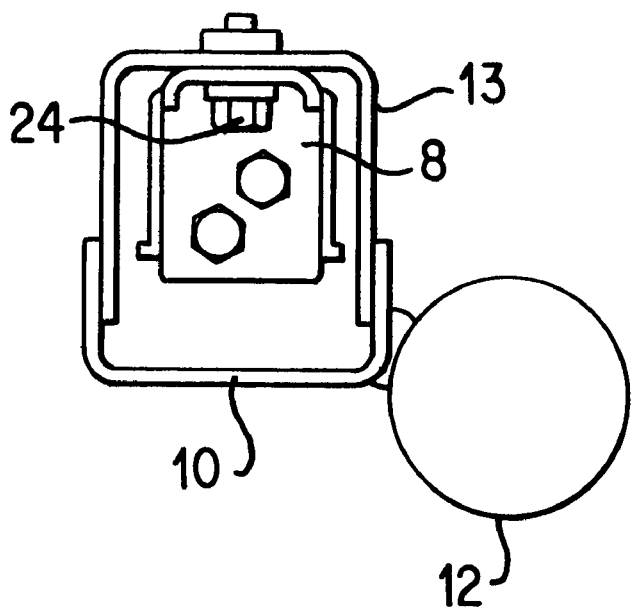
FIG. 3 is a view taken along an arrow III—III in FIG. 1.

As shown in FIGS. 1 and 2, a brake booster (2) is fixed to the engine room side of a dash panel (1) that partitions a vehicle into an engine room and a vehicle compartment. A front end of a pedal bracket (3) is fixed to the vehicle compartment side of the dash panel (1). A brake pedal (4) serving as a vehicle control pedal is pivotally supported on the pedal bracket (3). More specifically, a rotary support shaft (5) extending along the width of the vehicle is fixed to the pedal bracket (3), and the top end of the brake pedal (4) is pivotally supported on the rotary support shaft (5).

The brake booster (2) is provided with a leg-power transmission shaft (6) that penetrates through the dash panel (1) and extends into the vehicle compartment. The tip of the leg-power transmission shaft (6) is connected to a lever portion (4a) of the brake pedal (4). Depressing the brake pedal (4) transmits leg power to the brake booster (2) via the leg-power transmission shaft (6) to actuate a brake device that is not illustrated.

Figure 4:
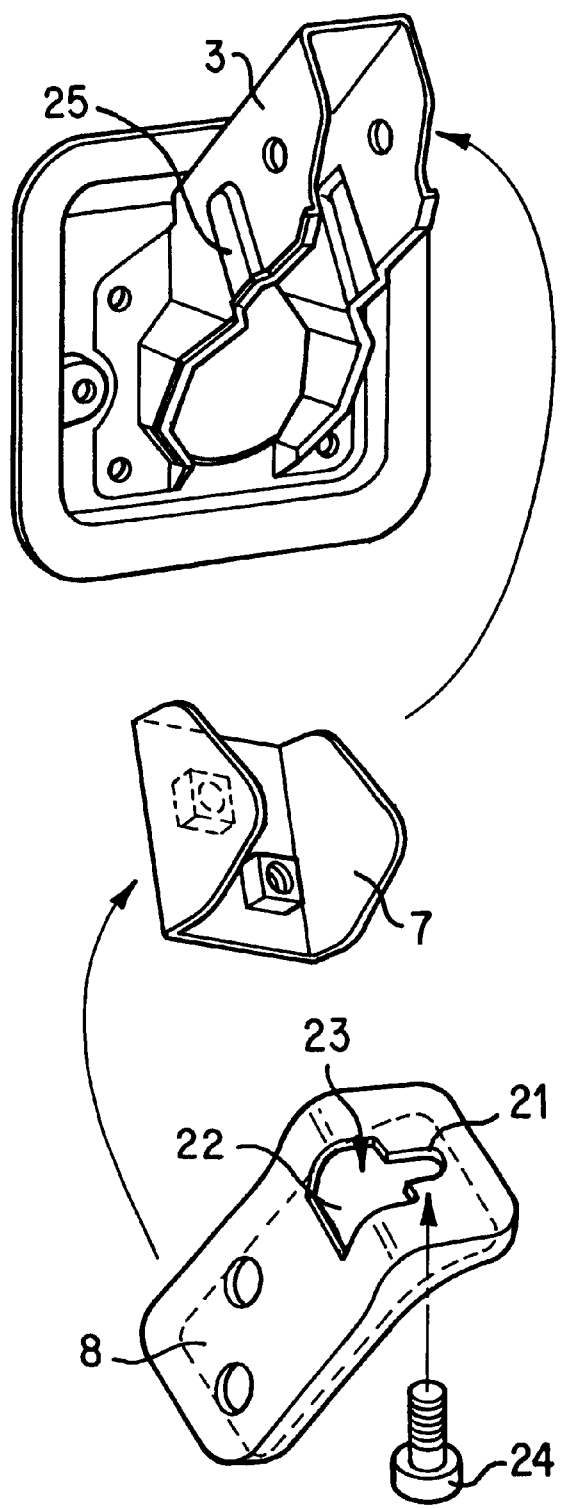
FIG. 4 is an exploded perspective view showing a pedal bracket assembly.
Figure 5:
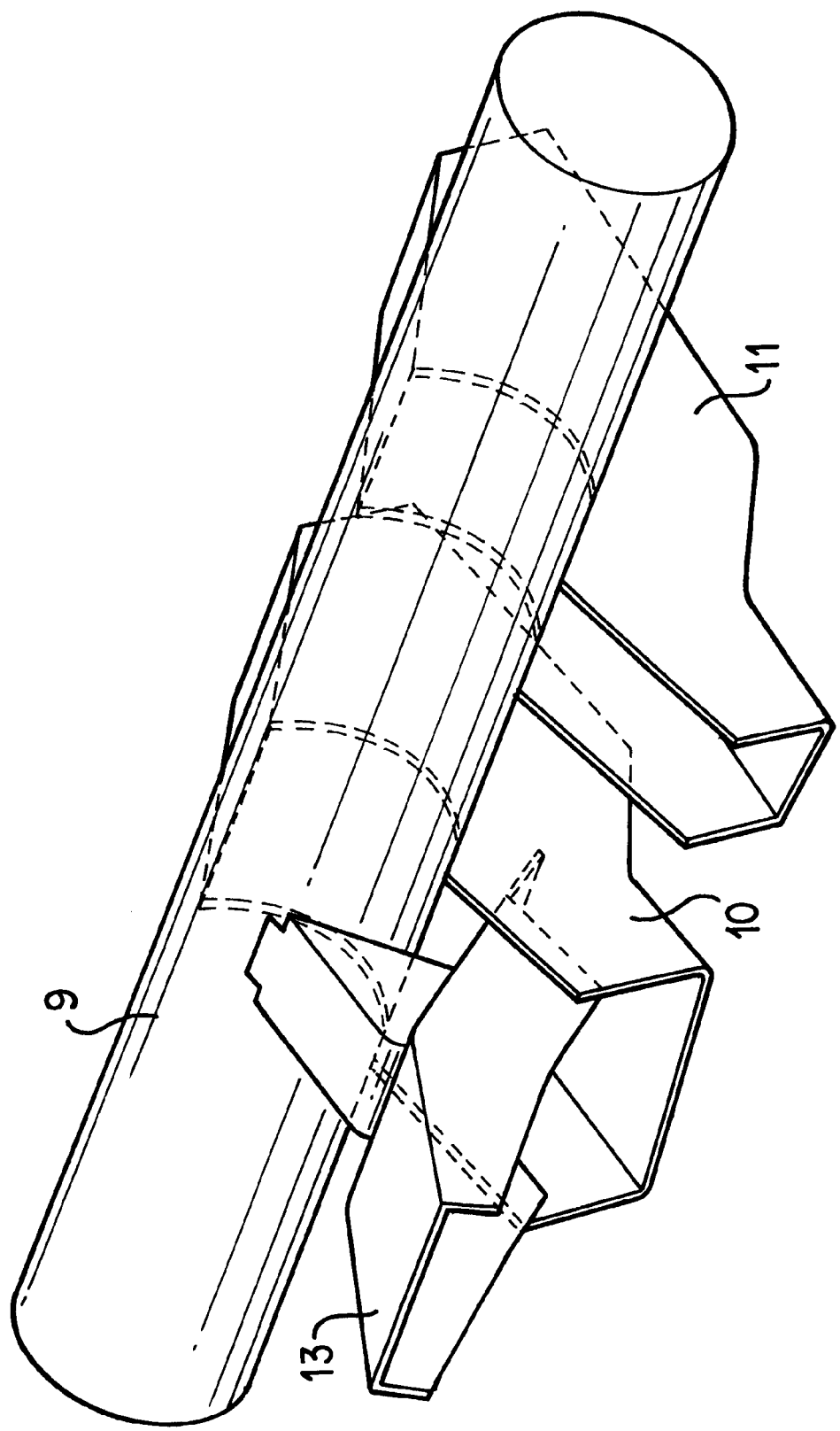
FIG. 5 is a perspective view showing a state in which a guide member is installed.

A bracket (8) is fixed to the rear end of the pedal bracket (3) via a reinforcing member (7), and a pedal bracket assembly is comprised of the pedal bracket (3), the reinforcing member (7), and the bracket (8) (See FIG. 4). As shown in FIGS. 1, 2, and 5, a deck cross pipe (9) serving as a component of a vehicle body is disposed behind the dash panel (1) in such a manner as to extend along the width of the vehicle, and a column support bracket (10) as a restricting section, which is opened at the top thereof to have a U-shaped cross-section, is fixed to the deck cross pipe 9 by welding. The column support bracket (10) and a column support bracket (11), as a pair, support a steering column (12) to the vehicle body via a support bracket (18).

As shown in FIGS. 1, 2, 3, and 5, a guide (13) as a guiding section, which is opened at the bottom thereof to have a U-shaped cross-section, is disposed diagonally downward in the opening at the top of the column support bracket (10), and the guide (13) has the bottom thereof being covered by the column support bracket (10) to form a closed cross-section. The guide (13) is fixed to the deck cross pipe (9) by welding. The bracket (8) (the rear end of the pedal bracket (3)) of the pedal bracket assembly and the guide (13) (a part fixed to the deck cross pipe (9) serving as the component of the vehicle body) in the pedal bracket assembly are connected together via a releasing mechanism (14).

A description will now be given of the releasing mechanism (14). As shown in FIGS. 1, 2, and 4, a bolt fastening section (23), where a slot (21) and an opening (22) are continuously provided, is formed in the bracket (8) of the pedal bracket assembly, and a bolt (24) is inserted into the slot (21) of the bolt fastening section (23) and fastened to the guide (13), so that the bracket (8) and the guide (13) are fixed to each other. If the bracket (8) of the pedal bracket assembly is displaced toward the rear of the vehicle, the bolt (24) relatively moves toward the opening (22) and falls out of the opening (22) to release the bracket (8) from the guide (13) and cause the guide (13) to guide the bracket (8) diagonally downward.

It should be noted that the releasing mechanism (14) may fix the bracket (8) and the guide (13) to each other by means of a bolt that is broken when the weight of a predetermined value or more is applied. Further, in addition to the releasing mechanism (14) with the above-described arrangement, a bead for crashing (25) may be provided in the pedal bracket (3). By this structure, when a collision occurs, the pedal bracket (3) is bent, so that the brake pedal (4) is displaced more easily toward the front of the vehicle.

There will now be described the operation of the rearward displacement prevention mechanism for control pedals.

When a large energy is applied to the vehicle from the front end due to a collision or the like, the brake booster (2) may be pressed toward the rear of the vehicle to cause the dash panel (1) to deform toward the vehicle compartment. If the dash panel (1) is deformed toward the vehicle compartment, a force is applied to the pedal bracket (3) in a direction toward the rear of the vehicle to cause the releasing mechanism (14) to release the bracket (8) from the guide (13) in the pedal bracket assembly.

The release of the bracket (8) from the guide (13) causes the bracket (8) to be displaced relatively toward the rear of the vehicle while being guided by the guide (13). Since the guide (13) is disposed diagonally downward, the bracket (8) at the top of the brake pedal (4) is guided diagonally downward. Therefore, the brake pedal (4) relatively moves toward the dash panel (1) to return to the front of the vehicle, and this ensures a space at the foot of a driver.

Further, since the guide (13) has the bottom thereof being covered by the column support bracket (10) to form a closed cross-section, the bracket (8) is surely guided to the closed sectional area constituted by the guide (13) and the column support bracket (10) even if the dash panel (1) is deformed in a different manner depending upon the types of collision such as head-on collision and offset collision, and the types of equipped engines.

This surely enables the brake pedal (4) to move back toward the dash panel (1) without inhibiting the guide (13) from guiding the bracket (8) when the dash panel (1) is deformed in directions including a horizontal direction. It is therefore possible to prevent the displacement of the brake pedal (4) in a desired condition irrespective of the state in which the dash panel (1) is deformed.

Further, since the guide (13) has the bottom thereof being covered by the column support bracket (10) to form a closed section, the column support bracket (10) prevents the bracket (8) from falling. This prevents the bracket (8) from excessively moving toward the vehicle compartment, and enables the brake pedal (4) to move back toward the dash panel (1) in a desired condition.

More specifically, even if the dash panel (1) is deformed toward the vehicle compartment to a large degree, the column support bracket (10) restricts the position of the bracket (8) to inhibit the bracket (8) from moving further. It is therefore possible to surely move the brake pedal (4) back to a desired position.

Further, since the column support bracket (10) supporting a steering column (12) constitutes the restricting section that guides the bracket (8), a common part can be used for supporting the steering column (12) and guiding the bracket (8). Incidentally, a specialized member may be used as the restricting section that constitutes the closed cross-section together with the guide (13).

It should be noted that the present invention may be applied not only to the brake pedal (4) but also to various kinds of vehicle control pedals such as a clutch pedal, an accelerator pedal, and an auxiliary brake pedal supported by the dash panel (1) via the pedal bracket.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed:

1. A rearward displacement prevention mechanism for control pedals, comprising:

a pedal bracket having one end thereof connected to a vehicle compartment side of a dash panel partitioning an engine room and the vehicle compartment and having a control pedal supported thereon;

a guide member connected to the pedal bracket;

a releasing mechanism for releasing the pedal bracket from the guide member to enable the pedal bracket to be displaced toward a rear of the vehicle, wherein said guide member includes a guiding section for guiding a portion of the pedal bracket downward toward the rear of the vehicle along a longitudinal direction of the vehicle when the pedal bracket is released from the guide member; and a restricting member forming a closed cross-section in conjunction with the guiding section to restrict movement of the portion of the pedal bracket to within a space defined by the guiding section and the restricting member.

2. A rearward displacement prevention mechanism for control pedals according to claim 1, wherein said restricting member is integrated with a support bracket of a steering column.

3. A rearward displacement prevention mechanism for control pedals according to claim 1, wherein said releasing mechanism is interposed between said pedal bracket and said guide member to connect said pedal bracket and said guide member.

4. A rearward displacement prevention mechanism for control pedals according to claim 1, wherein said guide member has a U-shaped cross-section.

5. A rearward displacement prevention mechanism for control pedals according to claim 1, wherein said pedal bracket has a bead for crashing.

6. A rearward displacement prevention mechanism for control pedals according to claim 1, wherein said pedal bracket has a bolt fastening section having a slot and opening, and connected with said guide member by a bolt inserted into the slot.

7. A rearward displacement prevention mechanism for control pedals according to claim 1, wherein said control pedal is at least one of a clutch pedal, an accelerator pedal, and an auxiliary brake pedal.

* * * * *